No. 677,361. Patented July 2, 1901.
C. E. LIVESAY.
WATER MODULE OR DELIVERY REGULATOR.
(Application filed Feb. 19, 1900.)
(No Model.) 3 Sheets—Sheet 1.
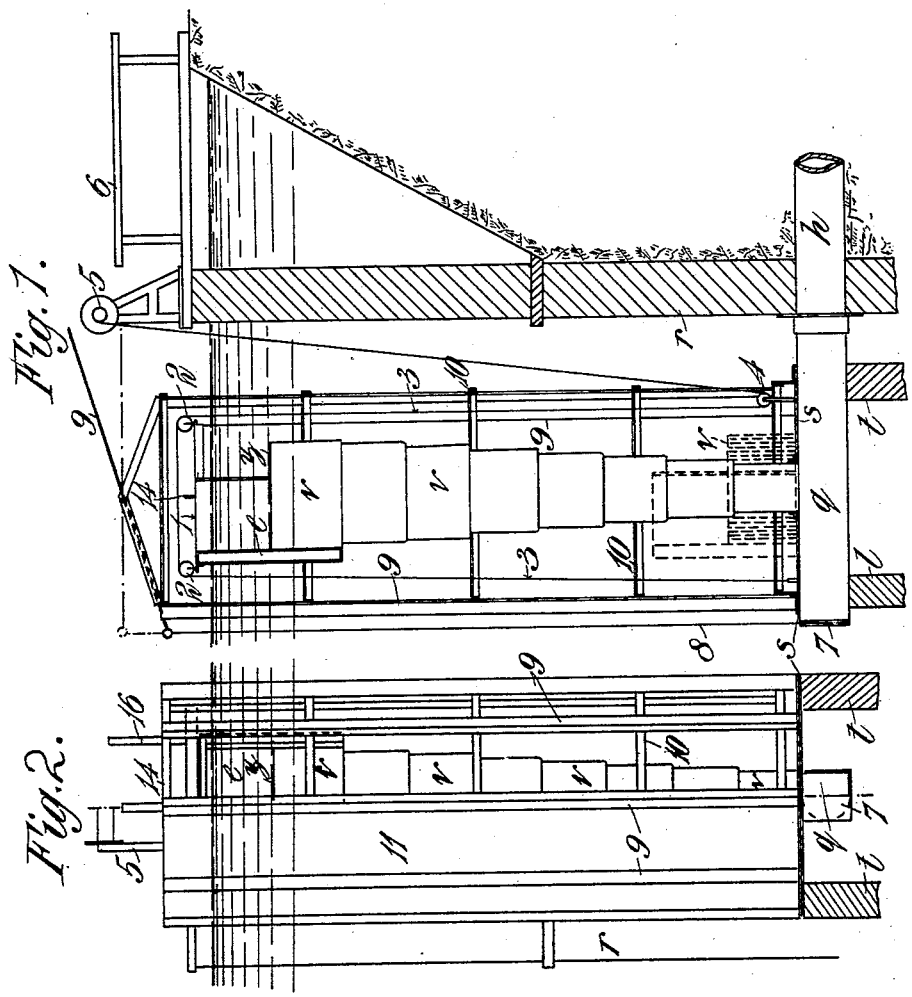
Witnesses
Hugh Duffy
E. J. Webb
Inventor
Charles Edward Livesay
O. E. Duffy
Atty No. 677,361. Patented July 2, 1901.
C. E. LIVESAY.
WATER MODULE OR DELIVERY REGULATOR.
(Application filed Feb. 19, 1900.)
(No Model.) 3 Sheets—Sheet 2.
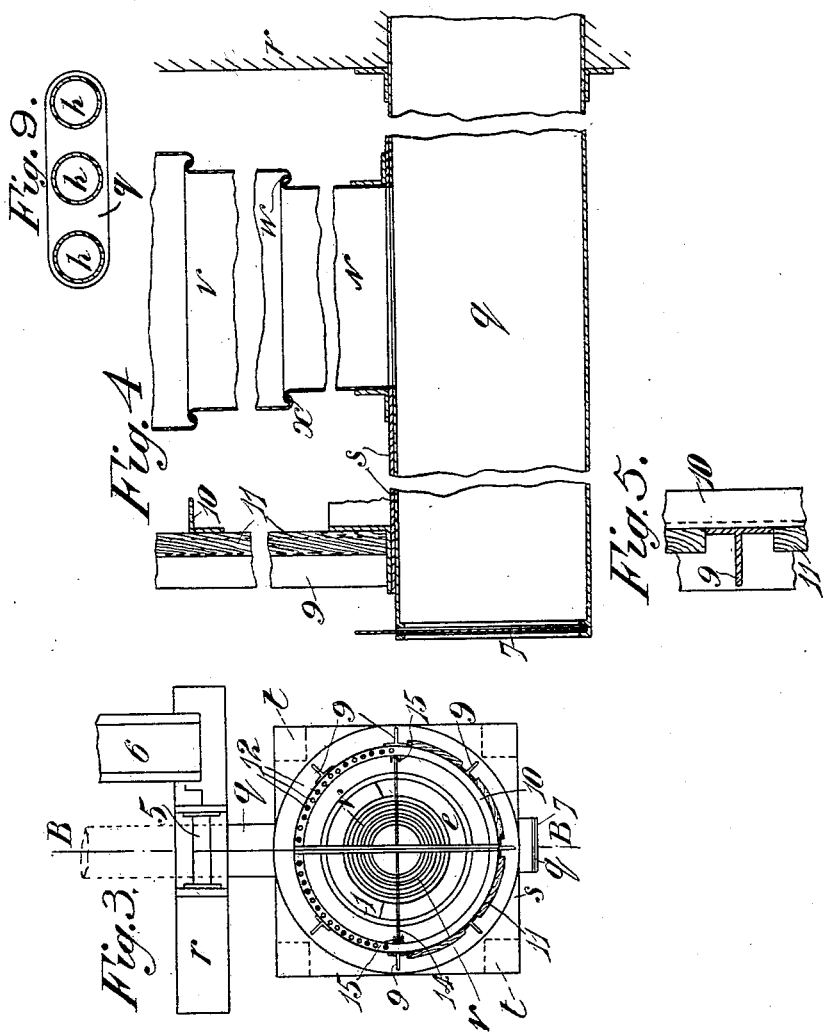
Witnesses
C. Hugh Duffy
E. J. Webb
Inventor
Charles Edward Livesay
per O. E. Duffy
Atty No. 677,361. Patented July 2, 1901.
C. E. LIVESAY.
WATER MODULE OR DELIVERY REGULATOR.
(Application filed Feb. 19, 1900.)
(No Model.) 3 Sheets—Sheet 3.

Witnesses
C Hugh Duffy

Inventor
Charles Edward Livesay
by O. E. Duffy
Atty.

UNITED STATES PATENT OFFICE.

CHARLES EDWARD LIVESAY, OF EALING, ENGLAND.

WATER MODULE OR DELIVERY REGULATOR.

SPECIFICATION forming part of Letters Patent No. 677,361, dated July 2, 1901.

Application filed February 19, 1900. Serial No. 5,744. (No model.)

*To all whom it may concern:*

Be it known that I, CHARLES EDWARD LIVESAY, a subject of the Queen of Great Britain and Ireland, residing at Castle Hill, Ealing, in the county of Middlesex, England, have invented improvements in means or apparatus for controlling the flow of water from rivers and other waterways to waterworks, docks, and other hydraulic works, of which the following is a specification.

I have found by experiment that the density of silt held in suspension in river and other water increases with the depth thereof from the surface where it is least, and this invention has reference to improved means or apparatus designed to enable the supply of water from a river or other source of supply (hereinafter called a "river") to a waterworks, docks, or other hydraulic works to be drawn from or as near as possible to the surface of the river where the quantity of silt is least, so as to thereby exclude the passage of the larger quantity of silt contained in the water at a greater depth. The means or apparatus used for this purpose according to this invention comprises a water-controlling pipe located in the river and connected to the water-supply pipe or pipes of the waterworks, docks, or the like, the said water-controlling pipe being arranged to rise and fall automatically with the level of the water in the river, so that its upper end shall be maintained at any desired depth near to and below the surface of such water.

Figure 6:
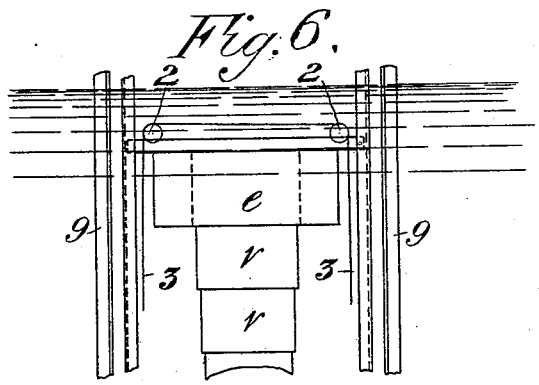

In the accompanying illustrative drawings, Figures 1, 2, and 3 show an arrangement of apparatus suitable for controlling the flow of water from a river to a dock, wherein the level of water is maintained by pumping, Fig. 1 being a vertical section of the line B B of Fig. 3; Fig. 2, an elevation, half as seen from the river and half as seen from the dock; and Fig. 3, a plan. Fig. 4 is a vertical section, and Fig. 5 a sectional plan, showing to a large scale details of construction of such apparatus. Fig. 6 is a part side elevation, Fig. 7 a part plan, and Fig. 8 a part side elevation, showing modified arrangements. Fig. 9 is a detail view showing a further modification.

The water-controlling apparatus shown in Figs. 1 to 5, inclusive, comprises a horizontal pipe $q$, which may be of square section and is connected to the outer end of the intake-pipe $h$, which is arranged below the lowest water-level or at any other desired level and extends through a vertical wall $r$, separating the dock from the river. The pipe $q$ is carried by and below a platform $s$, preferably of metal, supported by timber or other piles $t$. The top of the pipe $q$ and the platform $s$ are each formed with a circular hole of about the same diameter as the pipe. Above this platform the telescopic sections $y$ of the water-controlling pipe are arranged in a vertical position, each section being somewhat greater in diameter than the one below it, and the lowest one being secured to the platform $s$ over the hole therein. The upper end of each section, except the uppermost one, has an outwardly and downwardly curved rim $w$, and the lower end of each section, except the lowermost one, has an inwardly and upwardly curved rim $x$, the two rims on adjacent sections serving to keep the sections in alinement while moving endwise, and one entering the other, so as to prevent the passage of water and silt between them when the sections are moved apart to their fullest extent. The mode of interlocking or jointing the sections can, however, be varied, so long as the sections are allowed to work telescopically with close joints. To the topmost section is attached a float $e$, in the form of a water-tight casing, which extends upward beyond the top edge of the upper section $v$ and extends about half-way around the same, so as to leave the remaining portion of the upper edge $z$ of the said section open to receive the supply of river-water at a certain depth below the level of the river when the sections are extended to their fullest capacity or at any lower level at which the supply may be required.

Around the top of the float $e$ is fixed a support 1, carrying oppositely-arranged pulleys 2. To admit of the depth of submergence of the topmost section $v$ being regulated or controlled so as to admit of a full-bore supply of water being maintained through the intake-pipe $h$ at different levels of the river, a flexible connector 3, such as a chain, may be attached at one end to the platform $s$ and be led up over the said pulleys 2, then down under another pulley 4, connected to the said platform, and finally be led upward to a winch 5, placed on the wall r, which is built up to a suitable height above high-water level and can be reached from the bank, as by a gangway 6. As the level of the river falls the telescopic sections v descend and rest in succession on the platform s, as indicated in dotted lines in Fig. 1. When the level of the river is lower than the upper edge of the lowest section, a shutter or sluice 7, which normally closes the outer end of the horizontal pipe q, can be lifted by a chain 8 or the like, adapted to be raised by suitable means, such as a lever 9, which may be worked by an attendent standing on the wall r. In this way water can, if desired, be admitted to the intake-pipe h direct from the river at the level at which it has heretofore usually entered the intake-pipe.

The water-controlling pipe is surrounded by a framework comprising iron standards 9, that are connected together at intervals on the inner side, as by angle-iron ribs 10. On the river side this framework is covered by boards 11 for about half the circumference of the frame, the other half—viz., that on the land side—being fitted with vertical bars 12 to form a grid to keep out floating matter.

Figure 7:
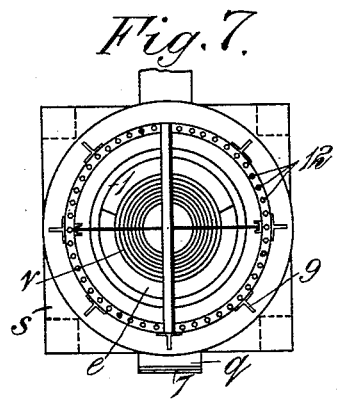

The float e need not extend above the water-level, but may extend to the same height as the top edge of the topmost section v, in which case it may wholly surround such section, as shown in Fig. 6, so as to enable the supply of water to be taken in more freely and at the same time allow of the top of the said section being kept nearer to the surface of the river. Similarly the covering of boards 11 on the outer side of the framework may, if desired, be dispensed with and grid-bars 12 be arranged all around the framework, as shown in Fig. 7, so as to admit water more freely and promote the object of keeping the mouth of the regulator as near as possible to the surface of the river. In order to prevent lateral movement of the telescopic regulator and insure its working vertically, a flat metal bar 14 may be fixed across the top of the float e and have its ends arranged to slide in fixed vertical guideways 15.

Figure 8:
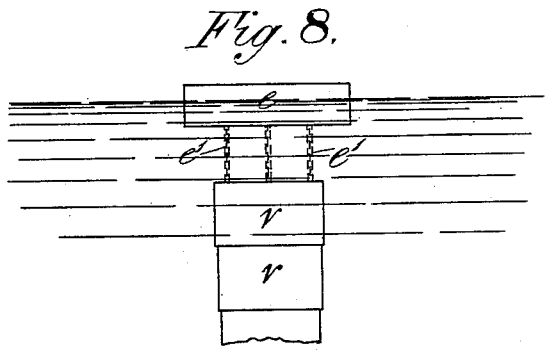

The float e is or may be provided with a vertical gage-rod 16, that can be read from the wall r, so as to admit of the attendant maintaining the desired depth of submergence of the top of the water-controlling pipe by means of the winch 5. The float e may be made separate from and be connected to the uppermost section v by rods or chains e', as shown in Fig. 8. In some cases the pulleys 2 and 4, chain 3, and winch 5 are dispensed with.

Apparatus of the kind hereinbefore described may also be adopted for waterworks where water is admitted thereto by gravitation. In this case when two or more inlet-pipes h are arranged close together to form the intake, Fig. 9, they may be connected together by an elongated box or pipe q, common to them, so that they can be supplied simultaneously by one water-controlling device instead of several.

It will be evident that various changes can be made in the details of construction of the apparatus without departing from the spirit and scope of the invention so long as the relative arrangements of parts shown in the drawings or the mode of operation described in the specification is preserved.

What I claim is—

1. Apparatus for controlling the flow of water from a river to a hydraulic works comprising a water-delivery pipe leading to the hydraulic works and having an inlet located below the lowest water-level in the river, means for opening and closing the inlet to said delivery-pipe, a water-controlling pipe located in the river and capable of rising and falling with the level thereof, said controlling-pipe having its lower end in connection with said delivery-pipe and its upper end near to and below the surface of the river, and means for supporting said controlling-pipe so as to maintain its upper end near to but below the level of the river.

2. Apparatus for controlling the flow of water from a river to a hydraulic works comprising a water-delivery pipe leading to the hydraulic works and extending into the river, below the lowest water-level thereof, a water-controlling pipe located in the river, having its lower end in connection with said delivery-pipe and capable of rising and falling with said river, a buoyant body located in said river and connected to the upper end of said water-controlling pipe so as to support the upper end of the latter at a suitable distance below the surface of the river, and a grid-like structure that is supported from the bed of the river and is adapted to protect said controlling-pipe, and to prevent the passage of weeds and other comparatively large floating bodies to the top of said controlling-pipe, substantially as described.

3. Apparatus for controlling the flow of water from a river to a hydraulic works, comprising a water-delivery pipe leading to the hydraulic works, a water-controlling pipe located in the river, having its lower end in connection with said delivery-pipe, and capable of rising and falling with said river, a buoyant body connected to the upper end of said water-controlling pipe, and adjusting means comprising a flexible connector whereby the position of said buoyant body and the upper open end of the pipe, relatively to the level of the river, can be simultaneously varied from the bank of the river against the lifting action of said buoyant body.

4. Apparatus for controlling the flow of water from a river to a hydraulic works, comprising a water-delivery pipe leading to the hydraulic works, a telescopic water-controlling pipe arranged vertically in the river, a buoyant body connected to the upper end of said telescopic pipe so as to support the same near to but below the level of said river, a stationary horizontal support to the upper and lower sides of which the lowest section of said telescopic pipe and the inlet end of the water-delivery pipe are respectively connected, through a hole in which these pipes communicate with each other, and upon which the other concentrically-arranged sections of the telescopic pipe can successively rest as the level of the river falls, and means for carrying said support independently of said water-delivery pipe, substantially as described.

5. Apparatus for controlling the flow of water from a river to a hydraulic works comprising a water-delivery pipe leading to the hydraulic works and located below the lowest water-level in said river, a second pipe extending into and supported within said river below the lowest water-level thereof, so as to constitute an extension of said delivery-pipe and having an inlet through which water can be admitted direct from the river to said pipe, means for controlling said inlet, a telescopic water-controlling pipe arranged vertically in the river and having its lower end in connection with said delivery-pipe through said second pipe, and a buoyant body connected to the upper end of said telescopic pipe, so as to support the same near to but below the level of said river, substantially as described.

6. Apparatus for controlling the flow of water from a river to a hydraulic works comprising a water-delivery pipe leading to the hydraulic works, a telescopic water-controlling pipe arranged vertically in said river and having its lower end in connection with said water-delivery pipe, a lower fixed support upon which the sections of the pipe can successively rest as the level of the river falls, a float supporting the upper end of said telescopic pipe near to but below the level of said river, and a protective grid-like frame surrounding said telescopic pipe, arranged to guide said pipe vertically and to support the same laterally, substantially as described.

7. Apparatus for controlling the flow of water from a river to a hydraulic works comprising a water-delivery pipe leading to the hydraulic works, a telescopic water-controlling pipe arranged vertically in said river and having its lower end in connection with said water-delivery pipe, a float supporting the upper end of said telescopic pipe near to but below the level of said river, and means whereby the position of the upper open end of the controlling-pipe relatively to the level of the river can be adjusted from the side of the river independently of the action of said float, substantially as described.

8. Apparatus for controlling the flow of water from a river to a hydraulic works, comprising a water-delivery pipe leading to the hydraulic works, a telescopic water-controlling pipe arranged vertically in said river and having its lower end in connection with said water-delivery pipe, a float fixed to and supporting the upper end of said telescopic pipe near to and below the level of said river, a fixed support for the lower end of said telescopic pipe, guide-pulleys connected to said float, a guide-pulley connected to said fixed support, a flexible connector secured at one end to said fixed support, passing over the pulleys carried by the float and under the guide-pulley connected to said fixed support, and means located on the bank of the river for drawing up the other end of said flexible connector and simultaneously depressing said float and the upper end of said pipe, substantially as described.

9. Apparatus for controlling the flow of water from a river to a waterworks, docks or the like, comprising a water-delivery pipe $h$ leading to the waterworks docks or the like, a fixed pipe $q$ located in said river and in connection with said delivery-pipe, a fixed support above said pipe $q$, a vertical telescopic water-controlling pipe having its lowest section fixed to said support and in communication with said pipe $q$, a float connected to the top section of said telescopic pipe and supporting the same near to but below the level of said river, and a protective framework surrounding said telescopic pipe, provided with a grid, and in which said telescopic pipe is guided, substantially as described for the purposes specified.

Signed at 77 Cornhill, in the city of London, England, this 6th day of February, 1900.

CHARLES EDWARD LIVESAY.

Witnesses:
  WM. O. BROWN,
  EDMUND S. SNEWIN.